US007038212B2

(12) United States Patent
Wollenweber et al.

(10) Patent No.: US 7,038,212 B2
(45) Date of Patent: May 2, 2006

(54) METHOD AND SYSTEM FOR NORMALIZATION OF A POSITRON EMISSION TOMOGRAPHY SYSTEM

(75) Inventors: Scott David Wollenweber, Advance, NC (US); Charles William Stearns, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 10/835,861

(22) Filed: Apr. 30, 2004

(65) Prior Publication Data

US 2005/0242288 A1    Nov. 3, 2005

(51) Int. Cl.
*G01T 1/164*    (2006.01)

(52) U.S. Cl. ................... 250/369; 250/363.03
(58) Field of Classification Search ................ 250/369, 250/363.1, 363.02, 363.03, 363.04, 252.1; 600/427, 436
See application file for complete search history.

(56) References Cited

U.S. PATENT DOCUMENTS

| | | | | |
|---|---|---|---|---|
| 5,331,553 A * | 7/1994 | Muehllehner et al. | . | 250/363.02 |
| 5,543,622 A | 8/1996 | Stearns | | |
| 5,703,369 A * | 12/1997 | Mori | ..................... | 250/363.03 |
| 5,750,991 A * | 5/1998 | Moyers et al. | ......... | 250/363.03 |
| 5,900,636 A * | 5/1999 | Nellemann et al. | .... | 250/363.04 |
| 6,040,580 A * | 3/2000 | Watson et al. | ......... | 250/363.03 |
| 6,177,675 B1 * | 1/2001 | Gagnon et al. | .......... | 250/363.1 |
| 6,229,145 B1 * | 5/2001 | Weinberg | ............... | 250/363.02 |
| 6,373,059 B1 * | 4/2002 | Stearns et al. | ......... | 250/363.03 |
| 6,410,920 B1 * | 6/2002 | Shao et al. | ............. | 250/363.04 |
| 6,462,342 B1 * | 10/2002 | Stearns | ................... | 250/363.03 |
| 6,528,793 B1 * | 3/2003 | Chen et al. | ............ | 250/363.03 |
| 6,590,213 B1 * | 7/2003 | Wollenweber | ......... | 250/363.03 |
| 6,631,284 B1 * | 10/2003 | Nutt et al. | ................... | 600/427 |
| 6,674,083 B1 * | 1/2004 | Tanaka et al. | ......... | 250/363.03 |
| 6,946,658 B1 * | 9/2005 | Tai | ......................... | 250/363.03 |
| 6,963,065 B1 * | 11/2005 | Conti et al. | .............. | 250/252.1 |
| 2002/0179843 A1 * | 12/2002 | Tanaka et al. | ......... | 250/363.03 |
| 2003/0111609 A1 * | 6/2003 | Zeng | ....................... | 250/363.1 |

OTHER PUBLICATIONS

S.D. Wollenweber, et al.,"Dead-time Correction for a Rotating Rod Normalization Correction in a Cylindrical PET System," IEEE Nuc. Science Symp. and Medical Imag. Conf. 2003.
Casey et al., "A Component-Based Method for Normalization in Volume PET" Proceedings of the 1995 International Meeting, Jul. 4-6, 1995, pp. 67-71.

\* cited by examiner

*Primary Examiner*—David Porta
*Assistant Examiner*—Faye Polyzos
(74) *Attorney, Agent, or Firm*—Carl B. Horton, Esq.; Armstrong Teasdale LLP

(57) ABSTRACT

A method and system for normalization of a positron emission tomography system is provided. The method includes acquiring three-dimensional normalization scan data from a positron emission tomography system with at least one septum and determining a down-sampling factor based in part on the configuration of the at least one septum. The method further includes modifying the three-dimensional normalization scan data using the down-sampling factor.

26 Claims, 4 Drawing Sheets

METHOD AND SYSTEM FOR NORMALIZATION OF A POSITRON EMISSION TOMOGRAPHY SYSTEM

BACKGROUND OF THE INVENTION

The present invention relates generally to image reconstruction in positron emission tomography (PET) systems. More particularly, the present invention relates to the determination of normalization factors utilized in image reconstruction.

Various techniques or modalities may be used for medical imaging of, for example, portions of a patient's body. PET imaging is a non-invasive nuclear imaging technique that allows the study of the internal organs of a human body. PET imaging allows the physician to view the patient's entire body at the same time. PET imaging produces images of many functions of the human body that are otherwise unobtainable.

In PET imaging, positron emitting isotopes are injected into the patient's body. These isotopes are referred to as radiopharmaceuticals, which are short-lived unstable isotopes. Once injected into the body, these isotopes decay and discharge positively charged particles called positrons. Upon being discharged, when these positrons encounter an electron, they are annihilated and converted into a pair of photons. The two photons are emitted in nearly opposite directions. A PET scanner typically includes several coaxial rings of detectors around the patient's body for detecting such annihilation events.

The detectors include crystals or scintillators to sense the scintillation of photons or gamma rays colliding with them. Coincidence detection circuits connected to the detectors record only those photons that are detected simultaneously by two detectors on opposite sides of the patient. During a typical scan, hundreds of millions of events are detected and recorded to indicate the number of annihilation events along lines joining pairs of detectors in the ring. The collected data is then used to reconstruct an image.

The existing PET scanners are based on either two-dimensional (2D) or three-dimensional (3D) data acquisition. In the case of 2D acquisition PET scanners, data is collected only along planes perpendicular to the central axis of the scanner. In order to collect data only from a single plane, the detector rings of the 2D PET scanners are separated by short septa or detector shields.

In the case of 3D PET scanners, the septa between the detector rings are removed. Data is collected throughout the sample volume and then reconstructed based on its actual trajectory through image space. These trajectories may or may not exist in one particular plane.

The data collected during a scan may contain inconsistencies. These inconsistencies may arise due to different factors, or the operating characteristics of the imaging systems, one of them being the presence of shields or septa between the detector rings of the PET scanner. The collected data is therefore normalized prior to using such data for reconstruction of the image. In accordance with the known methods for the normalization of scan data, correction factor is a product of (i) the single-crystal efficiencies of the two detectors forming the coincidence, and (ii) a geometric factor.

Several normalization methods are used to account for the differences in detection efficiency among the lines of response (LORs) in the system. Existing normalization methods account for the LOR radius and transaxial angle, but generally do not take the axial angle of the detector line or response into account. In at least one known method, the geometric factor is assumed to be a function of an LOR radius and an LOR angle in a single plane parallel to the detector rings. In 2D scanning, all the data is in the plane and the axial angle is zero. In 3D PET scanners, the absence of septa generally makes the response of the system independent of the axial angle. When septa are added to the 3D system, however, this is no longer true. Therefore, there exist significant axial angle effects.

These known methods for the normalization of scan data have several disadvantages. For example, in the case of 2D scanning, minor errors in the positioning of the septa of one millimeter (mm) or less can cause significant inaccuracies in the scan data. In many applications, such positioning errors are likely to occur. Further, in the case of 3D acquisition with the septa removed, the system records a larger number of false coincidence events and scattered photons. This increases noise in the image and therefore reduces image quality. When the septa are introduced between the detector rings of a 3D PET scanner there is a substantial geometric factor in the axial direction. There is no compensation for this substantial geometric factor in the known methods of image reconstruction.

Therefore, known image reconstruction methods fail to take into account the presence of septa for the purpose of the normalization in case of 3D PET scanners. Further, the known normalization methods do not compensate for the geometric factor that arises in the axial direction.

BRIEF DESCRIPTION OF THE INVENTION

In one exemplary embodiment, a method for the normalization of a positron emission tomography system having at least one septum is provided. The method includes acquiring three-dimensional normalization scan data from a positron emission tomography system having at least one septum and determining a down-sampling factor based in part on the configuration of the at least one septum. The method further includes modifying the three-dimensional normalization scan data using the down-sampling factor.

In another exemplary embodiment, a positron emission tomography system is provided. The system includes a positron emission tomography scanner for performing three-dimensional scans, with the positron emission tomography scanner having at least one septum. The system further includes a controller for controlling the normalization of the positron emission tomography scanner, with the controller configured to down-sample three-dimensional scan data received from the positron emission tomography scanner based in part on the configuration of the at least one septum.

DETAILED DESCRIPTION OF THE INVENTION

Figure 1:
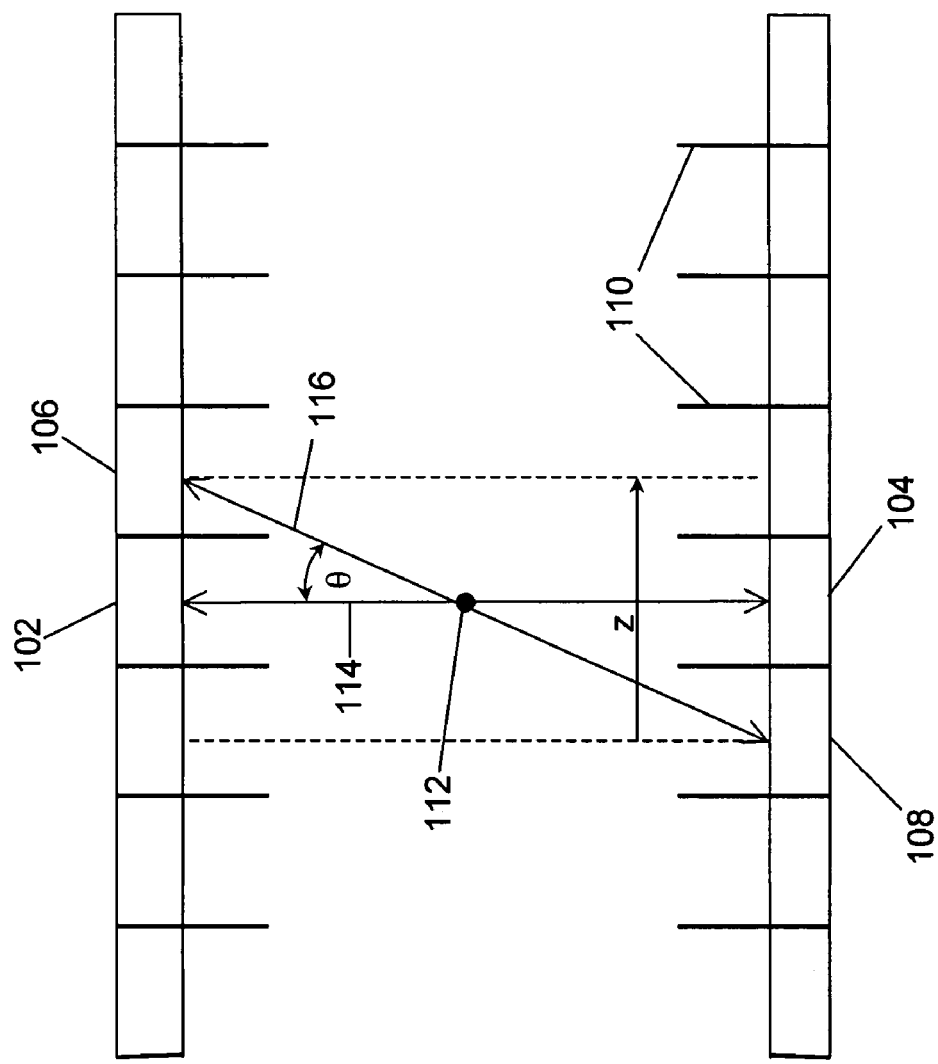
FIG. 1 is a schematic diagram showing multiple detector rings of a PET system in, accordance with one exemplary embodiment of the invention.
Figure 2:
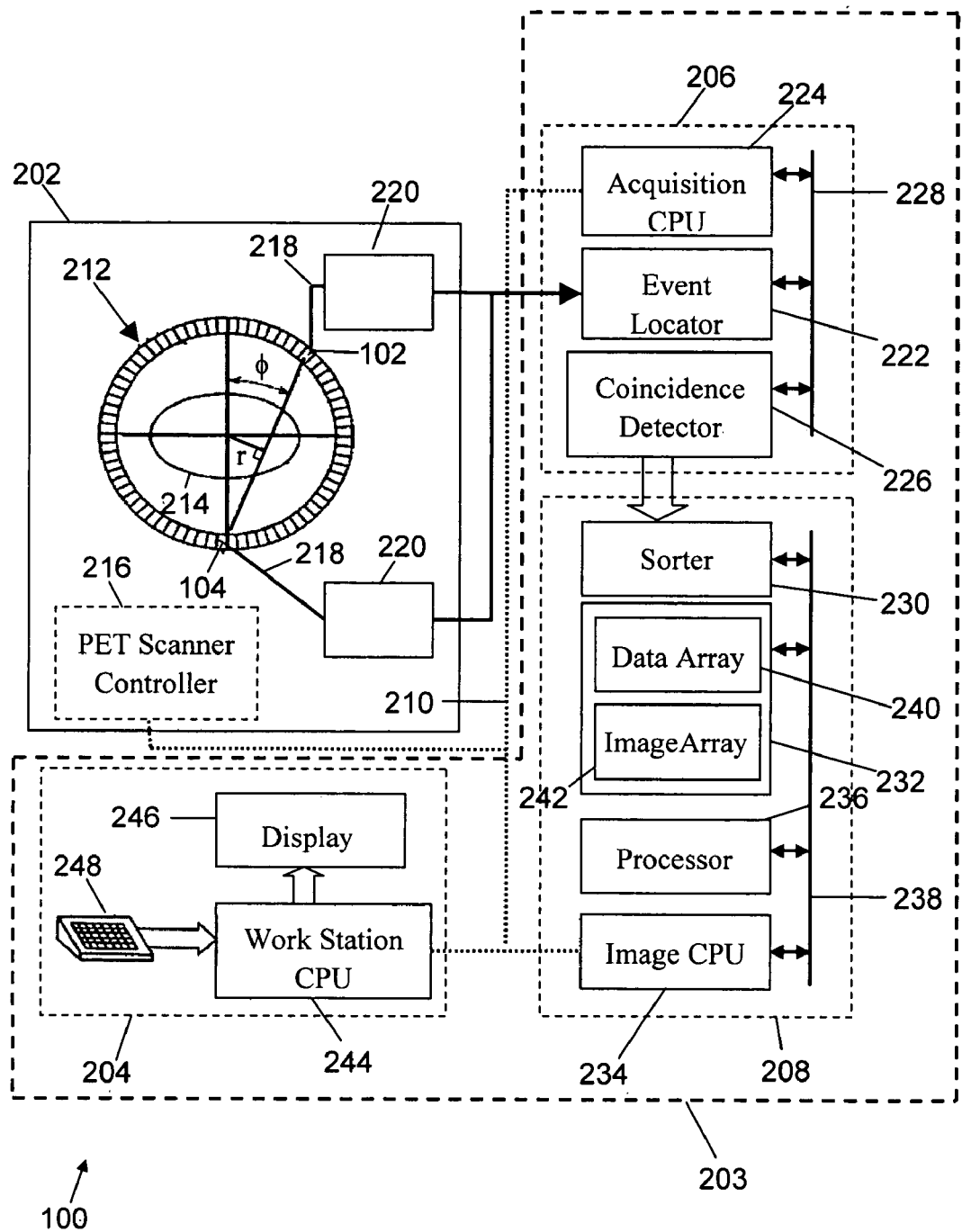
FIG. 2 is a block diagram of a PET system in accordance with one exemplary, embodiment of the invention.

FIG. 1 is a schematic diagram showing an exemplary embodiment of multiple detector rings 50 of a PET system 100 (shown in FIG. 2). PET system 100 may include several detector rings 50, with each detector ring 50 being formed of a plurality of detectors. In one embodiment of the invention, the PET system includes 24 co-axial detector rings. Detectors 102 and 104 are positioned on a detector ring 50 on opposite sides of detector ring 50. Detectors 106 and 108 are positioned on different detector rings 50. In one embodiment of the invention, each detector ring is separated by a septum 110. Septa 110 are annular disks shaped in the form of a ring or toroid. In another embodiment, septa 110 are present after every alternate detector ring 50. Septa 110 may be spaced after any number of detector rings 50. Septa 110 allow photons or gamma rays to travel only in the plane of a particular detector ring 50, and partially shield cross-plane photons. In one exemplary embodiment each of the septa 110 are 0.8 mm thick and 20 mm high. A 3D PET system 100 operating with such septa 110 will be referred to herein as operating in a 2.5-dimensional (2.5D) mode of operation. It should be noted that the various embodiments of the present invention may be implemented in connection with PET systems having septa 110 with different dimensions or different types of septa, such as, for example, sparse septa or focused septa (e.g., septa of varying length defined by distance from an axial center). Further, the various embodiments of the present invention may be implemented in connection with PET systems operating in different modes.

The lines along which the photons or gamma rays travel may or may not fall in the plane of a single detector ring 50. For example, a photon may encounter an electron and gets annihilated at point 112. The resulting pair of photons may travel in the plane of a single detector ring 50 along line of response (LOR) 114, or in a cross-plane along LOR 116. Photons moving in cross-plane LOR 116 are not shielded by septa 110 because of the height of septa 110 (e.g., their shorter height). In operation, LOR 114 is detected by a single ring of detectors 50, whereas LOR 116 is detected by two different detector rings 50.

FIG. 2 is a block diagram of an exemplary embodiment of a PET system 100. PET system 100 includes a PET scanner 202 and a controller 203 for controlling normalization and image reconstruction. Controller 203 for controlling normalization and image reconstruction, further includes an operator workstation 204, a data acquisition processor 206 and an image reconstruction processor 208. PET scanner 202, operator workstation 204, data acquisition processor 206 and image reconstruction processor 208 are interconnected via a communication link 210 (e.g., serial communication or wireless link). PET scanner 202 also referred to as a gantry, acquires scan data and transmits the scan data to data acquisition processor 206. The operation of the PET scanner 202 is controlled from operator workstation 204. The data acquired by data acquisition processor 206 is reconstructed into an image by image reconstruction processor 208.

PET scanner 202 supports a plurality of detector rings. One such detector ring, detector ring 212, is illustrated in the FIG. 2. Detector ring 212 includes a central opening, in which a patient 214 may be positioned using, for example, a motorized table, that is aligned with the central axis of detector ring 212. The motorized table moves patient 214 into the central opening of detector ring 212 in response to one or more commands received from operator workstation 204. A PET scanner controller 216, also referred to as gantry controller, is provided (e.g., mounted) within PET scanner 202. PET scanner controller 216 responds to the commands received from operator workstation 204 through communication link 210. Thus, the operation of PET scanner 202 is controlled from operator workstation 204 through PET scanner controller 216.

Detector ring 212 includes a plurality of detector units. In one exemplary embodiment, each detector ring comprises 70 detectors. For example, detector ring 212 includes detector 102 (shown in FIG. 1), detector 104 (shown in FIG. 1), and several other detectors. Detector 102, like the other detectors, includes a set of scintillator crystals arranged in a matrix that is disposed in front of a plurality of photomultiplier tubes (e.g., four tubes). In an exemplary embodiment, each detector comprises 6 crystals. When a photon collides with a crystal on a detector, it produces a scintilla on the crystal. Each photomultiplier tube produces an analog signal on line 218 when a scintillation event occurs. A set of acquisition circuits 220 is provided within PET scanner 202 to receive these analog signals. Acquisition circuits 220 produce digital signals indicating the 3D location of the event and the total energy of the event. Acquisition circuits 220 also produce an event detection pulse, which indicates the time or moment that the scintillation event occurred. These digital signals are transmitted through a communication link, such as, for example, a cable to an event locator circuit 222 in data acquisition processor 206. Data acquisition processor 206 includes event locator 222, an acquisition CPU 224, and a coincidence detector 226. Data acquisition processor 206 periodically samples the signals produced by acquisition circuits 220. Acquisition CPU 224 controls communications on a back-plane bus 228 and on communication link 210. Event locator circuit 222 processes the information regarding each valid event and provides a set of digital numbers indicative of the detected event. Specifically, this information indicates when the event took place and the position of the scintillation crystal that detected the event. An event data packet is communicated to coincidence detector 226 through back-plane bus 228. Coincidence detector 226 receives the event data packets from event locator circuit 222 and determines if any two of the detected events are in coincidence. Coincidence is determined by a number of factors. First, the time markers in each event data packet must be within a predetermined time period (e.g., 6.25 nanoseconds) of each other. Second, the LOR formed by a straight line joining the two detectors that detect the coincidence event, should pass through the field of view in the PET scanner 202. Events that cannot be paired are discarded. Coincidence event pairs are located and recorded as a coincidence data packet that is conveyed through a communication link to a sorter 230 in image reconstruction processor 208.

Image reconstruction processor 208 includes sorter 230, a memory module 232, an image CPU 234, an image processor 236, and a back-plane bus 238. Sorter 230 counts all events occurring along each projection ray and organizes the events into 3D data. This 3D data or sinograms are organized in one exemplary embodiment as a data array 240. Data array 240 is stored in memory module 232. Back-plane bus 238 is linked to communication link 210 through Image CPU 234. Image CPU 234 controls communication through back-plane bus 238. Array processor 236 is also connected to back-plane bus 238. Array processor 236 receives data array 240 as an input and reconstructs images in the form of image arrays 242. Resulting image arrays 242 are stored in memory module 232.

The images stored in image array 242 are communicated by image CPU 234 to operator workstation 204. Operator workstation 204 includes a CPU 244, a display device 246 and an input device 248. CPU 244 connects to communication link 210 and receives inputs (e.g., user commands) from input device 248. Input device 248 may be, for example, a keyboard, mouse or a touch-screen panel. Through input device 248 and associated control panel switches, the operator can control the calibration and configuration of the PET scanner 202, and the positioning of the patient 214 for a scan. Similarly, the operator can control the display of the resulting image on display device 246 and perform image enhancement functions using programs executed by workstation CPU 244.

Figure 3:
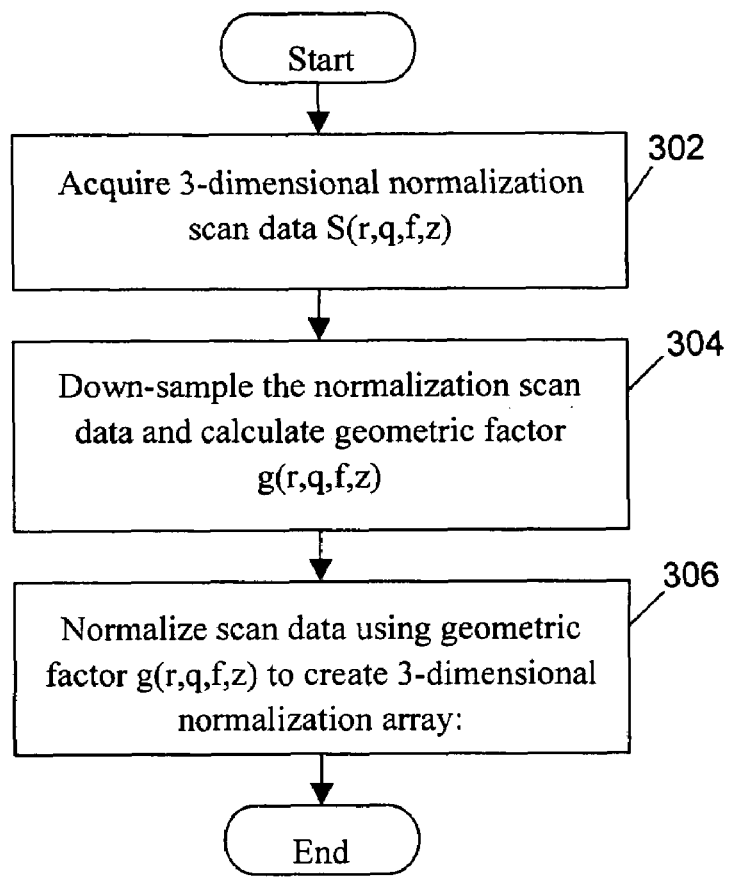
FIG. 3 is a flowchart illustrating a method for determining a normalization factor for image reconstruction, in accordance with one exemplary embodiment of the invention.

FIG. 3 is a flowchart illustrating a method for determining normalization factors for image reconstruction in accordance with one exemplary embodiment of the present invention. The method may be performed, for example, by processor 236 on data arrays 240 as a part of the image reconstruction process. Specifically, at 302, 3D normalization scans data $S(r,\theta,\phi,z)$ is obtained, where 'r', 'θ', 'φ' and 'z' are dimensions as shown in FIG. 1 and FIG. 2. 'r' is the perpendicular distance of an LOR from the central axis of detector ring 50; 'θ' is the angle that an LOR makes with a vertical passing through the central axis of the PET scanner, on a plane defined by the vertical and the central axis; 'φ' is angle that an LOR makes with the vertical; 'z' is the distance between the two detectors detecting an event in the direction of the axis of detector ring 50. This data may be obtained by performing a normalization scan using a rod source. The rod source is rotated along an orbit co-axial to the scanner and readings from different detectors are measured. This data also may be obtained by direct calculation using an analytic model. Further, this data may be predicted through Monte Carlo simulation of a scan, or through a combination of an analytic model and simulations.

At 304, the normalization scan data is down-sampled and a geometric factor $g(r,\theta,\phi,z)$ is calculated. Normalization scan data is down-sampled to a $\{r,\theta,\phi,z\}$ data set, wherein 'r' is the radial dimension of the data sinogram. For example, r is equal to 249 for a GE Discovery ST™ scanner manufactured by GE Medical Systems, which is a 3D image acquisition PET scanner. The total number of angles that are acquired by the scanner is 210. Down-sampling of normalization scan data is performed to take advantage of the symmetry in the detector geometry. In an exemplary embodiment of the invention, there are 420 crystals per ring, formed into 70 blocks of 6 crystals each. The crystals are arranged in the ring such that there exists a 70-fold symmetry around the detector ring. The geometric factors are expected to behave in a similar manner over this symmetry. Therefore, the value of the angular dimension of the down-sampled sinograms would be 6.

The down-sampled geometric scan data may also be represented in a $\{r,M,\phi\}$ data set. 'M' is the total number of sinograms. For example, if a particular scanner includes 24 detector rings, the total number of combinations of detector ring pairs would be 576 (24×24). In one embodiment, 'M' excludes combinations accounted for twice in the case of the neighboring or adjacent rings, in which case, the value of parameter M in this case is equal to 553 (576–23). Parameter 'M' therefore accounts for the parameter 'z' and parameter 'θ' in the $\{r,\theta,\phi,z\}$ data set. 'φ'. is a down-sample integral factor of a total number of acquired views. Therefore, a down-sampled set of $\{249,553,6\}$ is obtained in this example.

This data set is then used to calculate a geometric factor $g(r,\theta,\phi,z)$. In one embodiment of the invention, the average of normalization scan data $S(r,\theta,\phi,z)$ over every six values of φ is calculated to obtain the geometric factor $g(r,\theta,\phi,z)$. Other methods may also be used to calculate the values of geometric factor $g(r,\theta,\phi,z)$ from the normalization scan data $S(r,\theta,\phi,z)$.

At 306, a 3D normalization data array is determined using the geometric factor $g(r,\theta,\phi,z)$ and a crystal efficiency factor. A 3D phantom acquisition scan data is acquired to calculate the crystal efficiency factor. In accordance with one embodiment of the present invention, a phantom scan is performed, by limiting the range of the projection plane width, to cover the phantom only. Phantom scan data $S(u,v,\phi,\theta)$ is obtained from the phantom scan. Here, 'φ' and 'θ' define a projection plane for a particular LOR; 'u' and 'v' define Cartesian Coordinates in the projection plane. The 'u' and 'v' coordinates of the phantom scan data are related to the 'r' and 'z' coordinates, respectively, of the geometric factor according to the geometry of the particular PET scanner. The phantom scan $S(u,v,\phi,\theta)$ data is then divided by the geometric factor $g(r,\theta,\phi,z)$ to produce a sinogram $S'(u,v,\phi,\theta)$. A mean sinogram row $S'(u)$ is determined from the arithmetic or geometric mean of the rows of sinogram $S'(u,v,\phi,\theta)$. Further, sinogram $S'(u,v,\phi,\theta)$ is divided by the mean sinogram $S'(u)$ to produce a sinogram $S''(u,v,\phi,\theta)$. A crystal-averaging scheme can then be performed on $S''(u,v,\phi,\theta)$ to produce a crystal efficiency array $e(X,Z)$, which represents the number of events each crystal (X,Z) participated in. The efficiency array $e(X,Z)$ is scaled such that its average value over all $e(X,Z)$ is 1.0. Crystal-averaging schemes are well known and described, for example, by Chesler and Stearns, IEEE Trans. Nucl. Sci., Vol. 37(2), pgs. 768–772. Thereafter, a 3D normalization data array is created. The normalization data array $N(u,v,\theta,\phi)$ is defined as $1[g(r,\theta,\phi,z)e(X_1Z_1)e(X_2Z_2)]$.

The normalized data array $N(u,v,\theta,\phi)$ is used, for example, after performing a patient scan to normalize the data obtained in the scan. In particular, the measured scan data is multiplied by the normalization data array $N(u,v,\theta,\phi)$ to normalize the measured scan data. Other correction methods may also be performed as a part of the 3D image reconstruction process. These correction methods include methods for the correction of the dead time factor that arises because a single detector cannot process two simultaneous coincidences. Also, methods for artifact correction are performed, which account for scattered and random coincidences and attenuation of photons within a patient's body.

The various embodiments of the normalization data array methods described herein for use in creating the normalization array take into account that the septa and crystals may not be exactly located in their desired positions. Also the various embodiments disclosed compensate for sensitivity variations within a single detector ring as well as for relative cross-planar sensitivities across different detector rings. The various embodiments also take into account effects such as fishnet artifacts and variations in module-to-module spacing. As a result, the created normalization data array $N(u,v,\theta,\phi)$, facilitates the reconstruction of an improved image.

Moreover, the geometric factor arising in the axial or 'z' dimension may be significant in PET scanners containing septa between the detector rings. The various embodiments of the present invention compensate for this geometric factor, which also facilitates reconstruction of improved images.

Figure 5:
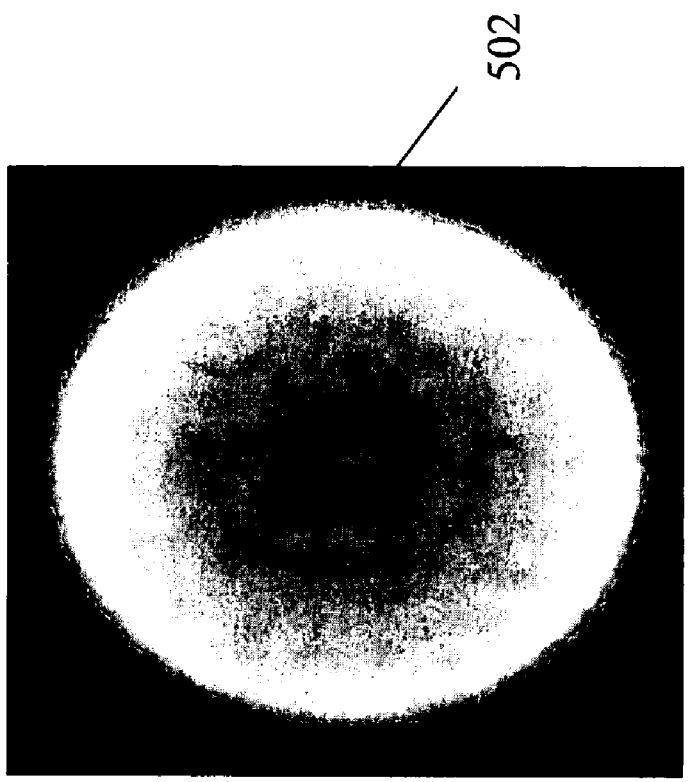
FIG. 4 and FIG. 5 are exemplary images illustrating the effect of a 3D normalization scheme on the reconstruction of a PET image.
Figure 4:
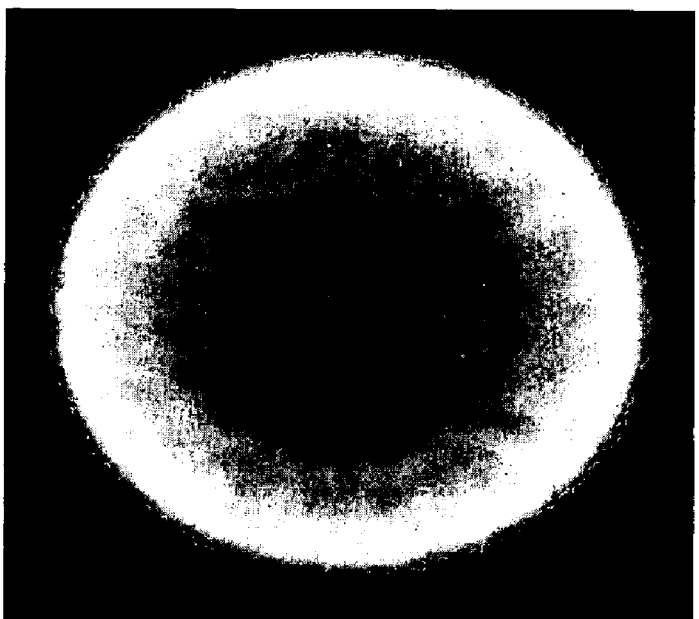

FIG. 4 and FIG. 5 show the effect of performing the 3D normalization in accordance with an embodiment of the invention on reconstruction of a PET image. Image 402 is an exemplary phantom image, reconstructed without using the 3D normalization. Image 502, on the other hand, is reconstructed using the 3D normalization in accordance with the disclosed method. Images 402 and 502 were obtained using a twenty centimeter (cm) diameter, twenty cm long uniform phantom flood in a PET scanner.

It should be noted that because the geometric factors do not change significantly over time, the 2D normalization scan to determine the geometric factors can be performed relatively infrequently. For example, the normalization scan may be performed once in every three months, or only once for a particular scanner or even for a particular scanner design. The 3D phantom acquisition scan and creation of an updated 3D normalization data array $N(u,v,\theta,\phi)$ based on the phantom acquisition scan is typically performed more often to estimate faster-changing single crystal efficiencies.

While the invention has been described in terms of various specific embodiments, those skilled in the art will recognize that the invention can be practiced with modification within the spirit and scope of the claims.

What is claimed is:

1. A method for normalization of a positron emission tomography system having at least one septum, said method comprising:
   acquiring three-dimensional normalization scan data from a positron emission tomography system having at least one septum;
   determining a down-sampling factor based in part on the configuration of the at least one septum; and
   modifying the three-dimensional normalization scan data using the down-sampling factor.

2. A method in accordance with claim 1 further comprising determining a geometric factor $g(r,\theta,\phi,z)$ based on the down-sampling, wherein r is a radial dimension of a data sinogram, $\theta$ is an angle of a line of response relative to a plane defined by a vertical and central axis, $\phi$ is an angle of a line of response defined by the vertical axis, and z is the distance between two detector rings in the positron emission tomography system.

3. A method in accordance with claim 1 wherein the down-sampling factor is based in part upon axial non-uniformities in the at least one septum.

4. A method in accordance with claim 1 further comprising performing a geometric scan to acquire the three-dimensional normalization scan data.

5. A method in accordance with claim 1 further comprising down-sampling the three-dimensional scan data to a down-sampled normalization data array $N(r,M,\Phi)$, wherein r is a radial dimension of a data sinogram, M is a total number of sinograms in a data set, and $\Phi$ is a down-sampled integral factor of a total number of acquired views.

6. A method in accordance with claim 5 wherein M is based on a total number of combinations of pairs of detector rings in the positron emission tomography system.

7. A method in accordance with claim 6 wherein the down-sampled normalization data array is based on a distance between detector rings in the positron emission tomography system.

8. A method in accordance with claim 1 wherein the at least one septum is configured to have a thickness of 0.8 mm and height of 20 mm.

9. A method in accordance with claim 1 wherein the three-dimensional normalization scan data is received from a positron emission tomography system operating in a 2.5 dimension acquisition mode.

10. A method in accordance with claim 1 wherein said acquiring comprises acquiring three-dimensional line-of-response data having all coincidence line-of-responses from an acquisition scan.

11. A method in accordance with claim 1 wherein the down-sampling factor is defined at least in part on an axial position and an axial angle of the positron emission tomography system.

12. A method in accordance with claim 1 wherein the down-sampling factor is defined at least in part on a set of transaxial angles and axial angles of the positron emission tomography system.

13. A method in accordance with claim 1 further comprising determining three-dimensional normalization scan data from at least one of a simulation, a plurality of measurements, modeling and analytical calculations.

14. A method in accordance with claim 1 wherein the at least one septum comprises a sparse septum.

15. A method in accordance with claim 1 wherein the at least one septum comprises a focused septum.

16. A method for determining normalization factors for a positron emission tomography system having at least one septum, said method comprising:
   obtaining three-dimensional acquisition scan data from a geometric scan performed with a positron emission tomography system having at least one septum;
   down-sampling the three-dimensional acquisition scan data, the three-dimensional acquisition scan data down-sampled to a normalization data array $N(r,M,\Phi)$, wherein r is a radial dimension of a data sinogram, M is a total number of sinograms in a data set, and $\Phi$ is a down-sampled integral factor of a total number of acquired views;
   determining a geometric factor $g(r,\theta,\phi,z)$ based on the down-sampling, wherein r is a radial dimension of a data sinogram, $\theta$ is an angle of a line of response relative to a plane defined by a vertical and central axis, $\phi$ is an angle of a line of response defined by the vertical axis, and z is the distance between two detector rings in the positron emission tomography system; and
   determining a three-dimensional normalization data array factors based on the geometric factor.

17. A method in accordance with claim 16 further comprising determining a down-sampling factor based in part on the configuration of the at least one septum.

18. A method in accordance with claim 17 wherein the down-sampling factor is based in part on axial non-uniformities in the at least one septum.

19. A method in accordance with claim 16 wherein said obtaining comprises acquiring three-dimensional line-of-response data from the geometric scan, wherein the three-dimensional line-of-response data include all coincidence line-of-responses from the geometric scan.

20. A method in accordance with claim 16 wherein the obtaining further comprising determining three-dimensional acquisition scan data from at least one of a simulation, a plurality of measurements, modeling and analytical calculations.

21. A method in accordance with claim 16 wherein the at least one septum is configured to have a thickness of about 0.8 mm and height of about 20 mm.

22. A positron emission tomography system comprising:
   a positron emission tomography scanner for performing three-dimensional scans, said positron emission tomography scanner having at least one septum; and
   a controller for controlling the normalization of said positron emission tomography scanner, said controller configured to down-sample three-dimensional scan data received from said positron emission tomography scanner based in part on the configuration of the at least one septum.

23. A positron emission tomography system in accordance with claim 22 wherein the three-dimensional scan data is down-sampled to a normalization data array $N(r,M,\Phi)$, wherein r is a radial dimension of a data sinogram, M is a total number of sinograms in a data set, and $\Phi$ is a down-sampled integral factor of a total number of acquired views.

24. A positron emission tomography system in accordance with claim 22 wherein a geometric factor $g(r,\theta,\phi,z)$ is determined based on the down-sampled normalization data array, wherein r is a radial dimension of a data sinogram, $\theta$ is an angle of a line of response relative to a plane defined by a vertical and central axis, $\phi$ is an angle of a line of response defined by the vertical axis, and z is the distance between two detector rings in the positron emission tomography system.

25. A positron emission tomography system in accordance with claim 22 wherein said controller is further configured to determine normalization factors based upon the down-sampled three-dimensional scan data.

26. A positron emission tomography system in accordance with claim 22 wherein the at least one septum is configured to have a thickness of about 0.8 mm and height of about 20 mm.

* * * * *